(12) United States Patent
Wright et al.

(10) Patent No.: US 10,894,356 B2
(45) Date of Patent: Jan. 19, 2021

(54) COATING PART PRECURSORS

(71) Applicant: Hewlett-Packard Development Company, L.P., Houston, TX (US)

(72) Inventors: Jake Wright, San Diego, CA (US); Ali Emamjomeh, San Diego, CA (US); Geoffrey Schmid, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 257 days.

(21) Appl. No.: 16/066,820

(22) PCT Filed: Apr. 15, 2016

(86) PCT No.: PCT/US2016/027914
§ 371 (c)(1),
(2) Date: Jun. 28, 2018

(87) PCT Pub. No.: WO2017/180159
PCT Pub. Date: Oct. 19, 2017

(65) Prior Publication Data
US 2019/0016045 A1    Jan. 17, 2019

(51) Int. Cl.
| | | |
|---|---|---|
| *B29C 64/188* | (2017.01) | |
| *C09D 1/00* | (2006.01) | |
| *C09D 7/40* | (2018.01) | |
| *B24C 1/04* | (2006.01) | |
| *B24C 11/00* | (2006.01) | |
| *B29C 71/00* | (2006.01) | |
| *C09D 127/18* | (2006.01) | |
| *C09D 123/28* | (2006.01) | |
| *B33Y 40/00* | (2020.01) | |

(52) U.S. Cl.
CPC .............. *B29C 64/188* (2017.08); *B24C 1/04* (2013.01); *B24C 11/005* (2013.01); *B29C 71/0009* (2013.01); *C09D 1/00* (2013.01); *C09D 7/40* (2018.01); *C09D 127/18* (2013.01); *B29C 2071/0027* (2013.01); *B33Y 40/00* (2014.12); *C09D 123/28* (2013.01)

(58) Field of Classification Search
None
See application file for complete search history.

(56) References Cited

U.S. PATENT DOCUMENTS

| | | |
|---|---|---|
| 2,788,297 A | 4/1957 | Louis |
| 6,596,041 B2 | 7/2003 | Rosenflanz |
| 7,998,910 B2 | 8/2011 | Todd |
| 8,637,162 B2 | 1/2014 | Zabinski |
| 2004/0148868 A1 | 8/2004 | Anderson et al. |
| 2007/0009667 A1* | 1/2007 | Gould ............... C23C 24/04 427/427.5 |
| 2009/0011682 A1 | 1/2009 | Mase |

(Continued)

FOREIGN PATENT DOCUMENTS

| | | |
|---|---|---|
| EP | 0558724 | 3/1995 |
| EP | 2506985 | 12/2013 |

*Primary Examiner* — Joseph A Miller, Jr.
(74) *Attorney, Agent, or Firm* — Dierker & Kavanaugh PC

(57) ABSTRACT

In a coating method example, a coating is formed on a part precursor by blasting the part precursor with a blast medium. The blast medium includes blasting beads and a coating agent. The part precursor is formed from a polymeric build material, and a hardness of the blasting beads is greater than a hardness of the polymeric build material.

9 Claims, 4 Drawing Sheets

(56) References Cited

U.S. PATENT DOCUMENTS

| | | |
|---|---|---|
| 2011/0049437 A1 | 3/2011 | Crain et al. |
| 2012/0077035 A1 | 3/2012 | Spahr et al. |
| 2013/0330470 A1 | 12/2013 | Gersch et al. |
| 2016/0082695 A1 | 3/2016 | Swartz et al. |

\* cited by examiner

COATING PART PRECURSORS

BACKGROUND

Three-dimensional (3D) printing may be an additive printing process used to make three-dimensional solid parts from a digital model. 3D printing is often used in rapid product prototyping, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
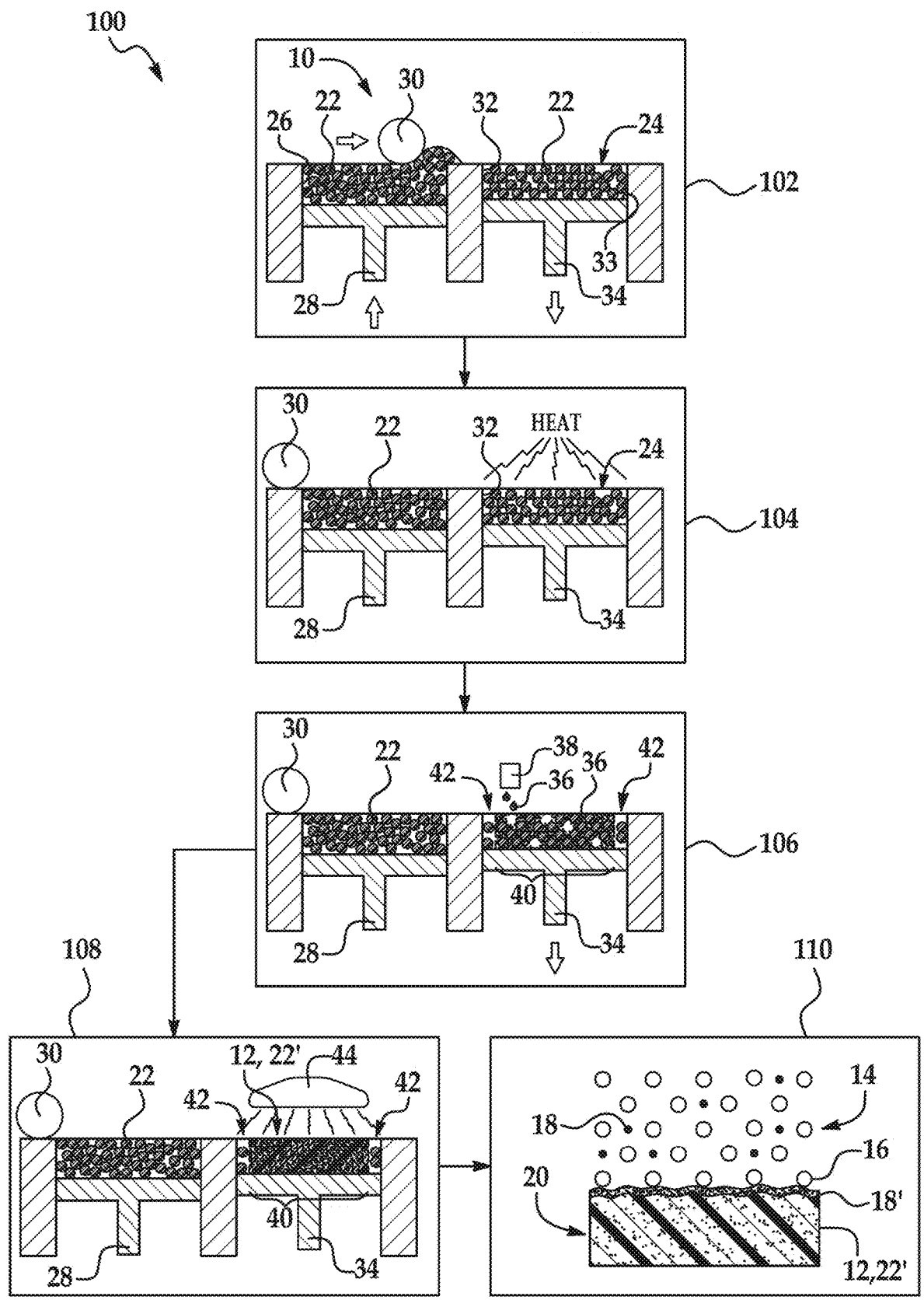
FIG. 1 is flow a diagram illustrating examples of a coating method disclosed herein.

Some examples of the coating method disclosed herein utilize parts formed via Multi Jet Fusion (MJF). During multi jet fusion, an entire layer of a build material (also referred to as build material particles) is exposed to radiation, but a selected region (in some instances less than the entire layer) of the build material is fused and hardened to become a layer of a 3D part. In the examples disclosed herein, a fusing agent is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

Other examples of the coating method disclosed herein utilize parts formed via other manufacturing methods, such as injection molding, selective laser sintering (SLS), fused deposition modeling (FDM), stereolithography (SLA), direct material jetting, etc.

Some 3D-printed parts, such as parts formed from MJF, FDM, SLA, or direct material jetting, tend not to be uniform in color. In particular, the sides of 3D-printed parts formed with MJF may exhibit a zebra pattern (i.e., black and white strips). The zebra pattern generally results from the use of a white build material and a black fusing agent. The fused build material powder is black and partially fused build material powder that is attached to the part is white.

Examples of the method disclosed herein utilize a coating to improve the cosmetics of parts formed by MJF and other manufacturing processes (e.g., injection molding, SLS, FDM, SLA, direct material jetting, etc.). The manufactured parts (without the coating disclosed herein thereon) are referred to as part precursors. More specifically, as used herein "part precursor" may be any part at any stage of formation/manufacturing or a fully formed part. For example, "part precursor" may refer to a fully formed 3D object formed by multi jet fusion without the coating thereon. In another example, "part precursor" may refer to a fully formed 3D object formed by another manufacturing process (e.g., injection molding, SLS, FDM, SLA, direct material jetting, etc.). Also as used herein, a "coated part," "final part," or "part" may be a completed object (formed via any manufacturing process) with the coating thereon, or a layer of a 3D printed part with the coating thereon.

The coating is formed on the part precursor by blasting the part precursor with a blast medium. The blast medium includes blasting beads and a coating agent (also referred to as coating agent particles). The part precursor is formed from a polymeric build material, and a hardness of the blasting beads is greater than a hardness of the polymeric build material. The hardness of the polymeric build material refers to the hardness of the material in its form in the part precursor. As such, the hardness of the polymeric build material refers to the hardness of the fused, molded, sintered, etc. polymeric build material, which may be different from the hardness of the polymeric build material, in powder form, used to build the part precursor.

The coating renders the final part dark, more uniform in color, rub-fast (i.e., substantially none of the coating will be removed from the coated part by rubbing), and water-fast (i.e., substantially none of the coating will be removed from the coated part by water exposure). Additionally, the final part, with the coating thereon, may be electrostatically dissipative depending on the coating agent used.

In some examples of the method disclosed herein, the blasting beads attach the coating agent to the part precursor with the help of Van der Waals forces. In other examples, the blasting beads embed the coating agent into the part precursor.

An example of the coating method 100 is depicted in FIG. 1. As an example, the method 100 may be used to create a part 20 that is dark and substantially uniform in color. As another example, the method 100 may be used to form an electrostatically dissipative part 20.

As shown at reference numeral 110, the method 100 includes forming a coating 18' on the part precursor 12 by blasting the part precursor 12 with a blast medium 14. The part precursor 12 may be blasted with the blast medium 14 using any suitable blasting technique. For example, the part precursor 12 may be blasted with the blast medium 14 with the aid of compressed air or a centrifugal wheel. In other examples, the part precursor 12 may be blasted with the blast medium 14 by using wet abrasive blasting, bead blasting, wheel blasting, hydro-blasting, micro-abrasive blasting, automated blasting, dry-ice blasting, or bristle blasting.

The part precursor 12 is formed from a polymeric build material 22' that has been fused, sintered, molded, etc. Examples of the polymeric build material 22' include semi-crystalline thermoplastic materials with a wide processing window of greater than 5° C. (i.e., the temperature range between the melting point and the re-crystallization temperature). Some specific examples of the polymeric build material 22' include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric build material 22' include polyethylene, polyethylene terephthalate (PET), and an amorphous variation of these materials. Still other examples of suitable polymeric build materials 22' include polystyrene, polyacetals, polypropylene, polycarbonate, polyester, thermal polyurethanes, other engineering plastics, and blends of any two or more of the polymers listed herein. Core shell polymer particles of these materials may also be used.

As shown in FIG. 1, some examples of the method 100 include forming the part precursor 12 (reference numerals 102-108). Forming the part precursor 12 will be discussed below in reference to reference numerals 102-108. In other examples of the method 100, the part precursor 12 is not formed via the process shown in reference numerals 102-108, but rather may be formed via any additive manufacturing process, such as SLS, FDM, SLA, or direct material jetting, or any other manufacturing process, such as injection molding. In still other examples of the method 100, the part precursor 12 may be an already formed part precursor. In these examples, the method 100 consists of coating the part precursor 12 as shown at reference numeral 110. When the part precursor 12 is not formed as part of the method 100, the part precursor 12 may have been previously formed by any manufacturing process (e.g., MJF, injection molding, other additive manufacturing processes, etc.).

The blast medium 14 includes the blasting beads 16 and the coating agent 18. In some examples, the blast medium 14 consists of these components with no other components. In other examples, the blast medium 14 may include additional components, such as water, soap, or dry ice. The blast medium 14 may be prepared by mixing the blasting beads 16 with the coating agent 18.

Blasting beads 16 are generally used to change the surface roughness of a part precursor 12 or to remove a contaminant or other unwanted component from the surface of a part precursor 12. In the context of 3D printing, blasting beads 16 are generally used to remove unfused/unsintered build material 22 from part precursor 12. In the method 100 disclosed herein, the blasting beads 16 may additionally be used to apply the coating agent 18 to the part precursor 12. In some examples of the method 100, the blasting beads 16 attach the coating agent 18 to the part precursor 12 with the help of Van der Waals forces. In other examples, the blasting beads 16 may embed the coating agent 18 into the part precursor 12.

The blasting beads 16 may be any suitable blasting beads that have a hardness that is greater than the hardness of the polymeric build material 22'. Examples of suitable blasting beads 16 include garnet blasting beads, glass blasting beads, alumina blasting beads, steel blasting beads, coal slag blasting beads, silicon carbide blasting beads, and combinations thereof.

As mentioned above, the blasting beads 16 have a hardness that is greater than the hardness of the polymeric build material 22'. The greater hardness of the blasting beads 16 helps the blasting beads 16 apply the coating agent 18 to the surface of the part precursor 12 to create a coating 18' on the part precursor 12 that is dark, substantially uniform, rub-fast (i.e., substantially none of the coating 18' will be removed from the coated part 20 by rubbing), and water-fast (i.e., substantially none of the coating 18' will be removed from the coated part 20 by water exposure). Additionally, the greater hardness of the blasting beads 16 may help the blasting beads 16 embed the coating agent 18 into the surface of the part precursor 12. For example, the harder blasting beads 16 may push the coating agent 18 onto or into the surface of the part precursor 12. In some examples, the blasting beads 16 may have a hardness that ranges from about 2 units to about 5 units harder than the hardness of polymeric build material 22' on the Mohs scale of hardness. For example, the polymeric build material 22' may have a hardness of about 3 on the Mohs scale, and the blasting beads 16 may have a hardness of about 7 on the Mohs scale. In another example, the polymeric build material 22' may have a hardness of about 3.5 on the Mohs scale, and the blasting beads 16 may have a hardness of about 6 on the Mohs scale.

The blasting beads 16 may be made up of similarly sized particles or differently sized particles. In the examples shown herein, the blasting beads 16 includes similarly sized particles. The term "size", as used herein with regard to the blasting beads 16, refers to the diameter of a substantially spherical particle (i.e., a spherical or near-spherical particle having a sphericity of >0.84), or the average diameter of a non-spherical particle (i.e., the average of multiple diameters across the particle). In an example, the average size of the blasting beads 16 ranges from about 0.1 mm to about 1 mm. Although it is contemplated that larger or smaller blasting beads 16 may be used, blasting beads 16 with an average size greater than 1 mm may slow down the coating process.

The coating agent 18 may be any suitable coating agent, such as dry lubricants. Examples of suitable coating agents include graphite, molybdenum disulfide, and polytetrafluoroethylene (PTFE).

The ability to create the coating 18' on the part precursor 12 that is dark, substantially uniform, rub-fast, and water-fast depends on the amount of coating agent 18 used and/or the size distribution of the coating agent 18, in addition to the hardness of the blasting beads 16 relative to the hardness of the polymeric build material 22'. When graphite is used as the coating agent 18, the springback value may also be taken into consideration.

If not enough coating agent 18 is used, the optical density of the coated part 20 may be too low or the coating 18' may be uneven. If too much coating agent 18 is used, the coating 18' may not be rub-fast and water-fast. The amount of the coating agent 18 may also affect the surface roughness of the part 20. In an example, the coating agent 18 may be present in an amount ranging from greater than 0 wt % to about 0.4 wt % based on a total wt % of the blast medium 14. In another example, the coating agent 18 may be present in an amount ranging from greater than 0 wt % to about 0.2 wt % based on a total wt % of the blast medium 14. In still another example, the coating agent 18 may be present in an amount of about 0.1 wt % based on a total wt % of the blast medium 14. In still another example, the coating agent 18 may be present in an amount of about 0.05 wt % based on a total wt % of the blast medium 14. The remainder of the blast medium 14 may be the blasting beads 16.

As mentioned above, the springback value of the graphite coating agent 18 may affect the darkness, uniformity, rub-fastness, and/or water-fastness of the coating 18'. The springback value measures the resilience of the compacted graphite coating agent 18. To test the springback value, a defined amount of the graphite coating agent powder 18 is poured into a die. A punch is inserted into the die, and the die is sealed. Air is evacuated from the graphite coating agent powder 18, and pressure (e.g., 0.477 t/cm$^2$) is applied. The thickness of the graphite coating agent powder 18 is measured while the pressure is applied and again once the pressure is released. The springback value is the percentage of the thickness of the graphite coating agent powder 18 that does not change when pressure is applied, and can be calculated by the following formula:

$$SB = (H_{(O)} - H_{(P)})/H_{(O)} \times 100\%$$

where SB is the springback value, $H_{(P)}$ is the thickness while the pressure is applied, and $H_{(O)}$ is the thickness once the pressure is released. A low springback value helps create a good graphite coating 18' (i.e., dark, substantially uniform, rub-fast, and water-fast). The springback value is related to the percent crystallinity and density of the graphite. High crystallinity and density of the graphite coating agent 18 result in a low springback value. In an example, the coating agent 18 may have a springback value that is less than about 20%.

The size distribution of the coating agent 18 may also affect the darkness, uniformity, rub-fastness, and/or water-fastness of the coating 18'. If the particle size of the coating agent 18 is too small (e.g., less than 15 μm), not all of the particles of the coating agent 18 that make up the coating 18' may come into contact with the part precursor 12. Instead, some of the particles of the coating agent 18 may be on top of other particles of the coating agent 18. In these instances, the particles of the coating agent 18 that are not in contact with the part precursor 12 may not be sufficiently affixed to the part precursor 12. This can result in the particles rubbing off of the part precursor 12. If the particle size of the coating agent 18 is too large (e.g., greater than 70 μm), the particles may not attach, or may not attach well, to the part precursor 12. This can result in a non-uniform coating that is neither rub-fast nor water-fast. Thus, if the particles size of the coating agent 18 is too small or too large, the coating 18' may not be as dark, uniform, rub-fast, and/or water-fast as it would be if the particles of the coating agent 18 were of a size that enables them to be sufficiently affixed to the part precursor 12. The coating agent 18 disclosed herein has a particle size ranging from 15 μm to 70 μm, which provides a suitable surface area that enables the particles to attach to surface of the part precursor 12 in a suitable manner.

The term "size", as used herein with regard to the particles of the coating agent 18, refers to the diameter of a substantially spherical particle (i.e., a spherical or near-spherical particle having a sphericity of >0.84), or the average diameter of a non-spherical particle (i.e., the average of multiple diameters across the particle). In addition to the example range provided above, the average size of the coating agent particles 18 may range from about 20 μm to about 70 μm. In an example, the coating agent particles 18 have a particle size distribution of D90≤70 μm. In another example, the coating agent particles 18 have a particle size distribution of D90≥20 μm. In still another example, the coating agent particles 18 have a particle size distribution of 20 μm≤D90≤70 μm. In all of these examples, D90 is the average particle size of which 90% of the particles of the coating agent 18 population are smaller. In other words, D90 is the diameter at which 90% of the coating agent's mass is comprised of smaller particles.

The combination of blasting beads 16 and coating agent 18 used may also contribute to the coating 18' that is dark, substantially uniform, rub-fast, and water-fast. Some examples of suitable combinations of the blasting beads 16 and the coating agent 18 include garnet blasting beads, glass blasting beads, alumina blasting beads, or a combination of glass blasting beads and alumina blasting beads with graphite, molybdenum disulfide, or PTFE. Another example of a suitable combination includes silicon carbide blasting beads and PTFE.

As mentioned above, the coating 18' is dark, substantially uniform, rub-fast, and water-fast. Additionally, the coating 18' may allow the coated part 20 to be electrostatically dissipative, depending on the coating agent 18 used. When the coating agent 18 is graphite, molybdenum disulfide, or PTFE, the coated part 20 may be an electrostatically dissipative part 20 because the coating 18' is able to conduct electric current. The coating 18' may allow the coated part 20 to ground charges in a controlled manner. It is to be understood that the grade of the graphite and/or molybdenum disulfide may alter the electrostatically dissipative properties.

In some examples, the coating 18' attaches to the part precursor 12 due to Van der Waals forces. In other examples, the coating 18' is partially embedded into the part precursor 12.

The coating 18' is a thin coating. In an example, the coating 18' has a thickness ranging from about 10 nm to about 20 μm.

As mentioned above, the method 100 may also include forming the part precursor 12. An example of a process used to form the part precursor 12 is depicted in FIG. 1 at reference numerals 102-108.

As shown at reference numeral 102, the method 100 may include applying a polymeric build material 22. One layer 24 of the polymeric build material 22 has been applied.

The polymeric build material 22 may be a powder, a liquid, a paste, or a gel. The polymeric build material 22 may be any of the polymeric build materials 22' list above in reference to the part precursor 12.

The polymeric build material 22 may have a melting point ranging from about 50° C. to about 400° C. This range may vary, depending upon the polymeric build material 22 that is used. As examples, the polymeric build material 22 may be a polyamide having a melting point of 180° C., or a thermal polyurethane having a melting point ranging from about 100° C. to about 165° C.

The polymeric build material 22 may be made up of similarly sized particles or differently sized particles. In the examples shown herein, the polymeric build material 22 includes similarly sized particles. The term "size", as used herein with regard to the polymeric build material 22, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the polymeric build material 22 may be greater than 1 μm and may be up to about 500 μm. Substantially spherical particles of this particle size have good flowability and can be spread relatively easily. As another example, the average size of the particles of the polymeric build material 22 ranges from about 10 μm to about 200 μm. As still another example, the average size of the particles of the polymeric build material 22 ranges from 20 μm to about 60 μm.

It is to be understood that the polymeric build material 22 may include, in addition to polymer particles, a charging agent, a flow aid, or combinations thereof.

Charging agent(s) may be added to suppress tribo-charging. Examples of suitable charging agent(s) include aliphatic amines (which may be ethoxylated), aliphatic amides, quaternary ammonium salts (e.g., behentrimonium chloride orcocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymeric build material 22.

Flow aid(s) may be added to improve the coating flowability of the polymeric build material 22. Flow aid(s) may be particularly beneficial when the particles of the polymeric build material 22 are less than 25 μm in size. The flow aid improves the flowability of the polymeric build material 22 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt. % to less than 5 wt. % based upon the total wt. % of the polymeric build material 22.

In the example shown at reference numeral 102, applying the polymeric build material 22 includes the use of the printing system 10. The printing system 10 may include a supply bed 26 (including a supply of the polymeric build material 22), a delivery piston 28, a spreader 30 (an example of which is the roller shown in FIG. 1), a fabrication bed 32 (having a contact surface 33), and a fabrication piston 34. Each of these physical elements may be operatively connected to a central processing unit (not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the part precursor 12. The data for the selective delivery of the polymeric build material 22, the fusing agent 36, etc. may be derived from a model of the part precursor 12 to be formed. For example, the instructions may cause the controller to utilize a build material distributor to dispense a layer 24 of the polymeric build material 22, and to utilize applicator(s) 38 (e.g., inkjet applicator(s)) to selectively dispense the fusing agent 36.

The delivery piston 28 and the fabrication piston 34 may be the same type of piston, but are programmed to move in opposite directions. In an example, when a layer of the part precursor 12 is to be formed, the delivery piston 28 may be programmed to push a predetermined amount of the polymeric build material 22 out of the opening in the supply bed 26 and the fabrication piston 34 may be programmed to move in the opposite direction of the delivery piston 28 in order to increase the depth of the fabrication bed 32. The delivery piston 28 will advance enough so that when the spreader 30 pushes the polymeric build material 22 into the fabrication bed 32 and onto the contact surface 33, the depth of the fabrication bed 32 is sufficient so that a layer 24 of the polymeric build material 22 may be formed in the fabrication bed 32. The spreader 30 is capable of spreading the polymeric build material 22 into the fabrication bed 32 to form the polymeric build material layer 24, which is relatively uniform in thickness. In an example, the thickness of the polymeric build material layer 24 ranges from about 30 μm to about 70 μm, although thinner or thicker layers may also be used. For example, the thickness of the layer 24 may range from about 50 μm to about 1000 μm. Depending upon the desired thickness for the layer 24 and the particle size of the polymeric build material 22, the layer 24 that is formed in a single build material application may be made up of a single row of polymeric build material particles 22 or several rows of polymeric build material particles 22 (as shown at reference numeral 102).

The spreader 30 shown is a roller. It is to be understood that the spreader 30 may be replaced by other tools, such as a blade that may be useful for spreading different types of powders, or a combination of a roller and a blade.

The supply bed 26 that is shown is one example, and could be replaced with another suitable delivery system to supply the polymeric build material 22 to the fabrication bed 32. Examples of other suitable delivery systems include a hopper, an auger conveyer, or the like.

The fabrication bed 32 that is shown is also one example, and could be replaced with another support member, such as a platen, a print bed, a glass plate, or another build surface.

As shown at reference numeral 104 in FIG. 1, the layer 24 of the polymeric build material 22 may be exposed to heating after the layer 24 is applied in the fabrication bed 32 (and prior to selectively applying the fusing agent 36). Heating is performed to pre-heat the polymeric build material 22, and thus the heating temperature may be below the melting point of the polymeric build material 22. As such, the temperature selected will depend upon the polymeric build material 22 that is used. As examples, the heating temperature may be from about 5° C. to about 50° C. below the melting point of the polymeric build material 22. In an example, the heating temperature ranges from about 50° C. to about 400° C. In another example, the heating temperature ranges from about 150° C. to about 170° C.

Pre-heating the layer 24 of the polymeric build material 22 may be accomplished using any suitable heat source that exposes all of the polymeric build material 22 in the fabrication bed 32 to the heat. Examples of the heat source include a thermal heat source (e.g., a heater (not shown) of the fabrication bed 32) or an electromagnetic radiation source (e.g., infrared (IR), microwave, etc.).

After the polymeric build material 22 is applied at reference numeral 102 and/or after the polymeric build material 22 is pre-heated at reference numeral 104, the fusing agent 36 is selectively applied on at least a portion 40 of the polymeric build material 22, in the layer 24, as shown at reference number 106.

The fusing agent 36 may be dispensed from any suitable applicator. As illustrated in FIG. 1 at reference number 106, the fusing agent 36 may be dispensed from an inkjet printhead 38, such as a thermal inkjet printhead or a piezoelectric inkjet printhead. The printhead may be a drop-on-demand printhead or a continuous drop printhead. The applicator(s) 38 selectively applies the fusing agent 36 on those portions 40 of the polymeric build material 22 from which the part precursor 12 is to be formed. The fusing agent 36 is not applied on the portions 42. As such, polymeric build material 22 in those portions 42 do not fuse to become the part precursor 12.

The applicator 38 may be selected to deliver drops of the fusing agent 36 at a resolution ranging from about 300 dots per inch (DPI) to about 1200 DPI. In other examples, the applicator 38 may be selected to be able to deliver drops of the fusing agent 36 at a higher or lower resolution. The drop velocity may range from about 5 m/s to about 24 m/s and the firing frequency may range from about 1 kHz to about 100 kHz. The applicator 38 may include an array of nozzles through which it is able to selectively eject drops of fluid. In one example, each drop may be in the order of about 10 pico liters (pl) per drop, although it is contemplated that a higher or lower drop size may be used. In some examples, applicator 38 is able to deliver variable size drops of the fusing agent 36. The applicator(s) 38 may be attached to a moving XY stage or a translational carriage (neither of which is shown) that moves the applicator(s) 38 adjacent to the polymeric build material 22 in order to deposit the fusing agent 36 in desirable area(s) 40. In other examples, the applicator(s) 38 may be fixed while a support member (supporting the polymeric build material 22) is configured to move relative thereto. The applicator(s) 38 may be programmed to receive commands from a central processing unit and to deposit the fusing agent 36 according to a pattern of a particular layer of the part precursor 12.

In an example, the applicator(s) 38 may have a length that enables it to span the whole width of the support member (e.g., the fabrication bed 32) in a page-wide array configuration. As used herein, the term 'width' generally denotes the shortest dimension in the plane parallel to the X and Y axes of the support member, and the term 'length' denotes the longest dimension in this plane. However, it is to be understood that in other examples the term 'width' may be interchangeable with the term 'length'. In an example, the page-wide array configuration is achieved through a suitable arrangement of multiple applicators 38. In another example, the page-wide array configuration is achieved through a single applicator 38. In this other example, the single applicator 38 may include an array of nozzles having a length to enable them to span the width of the support member. This configuration may be desirable for single pass printing. In still other examples, the applicator(s) 38 may have a shorter length that does not enable them to span the whole width of the support member. In these other examples, the applicator(s) 38 may be movable bi-directionally across the width of the support member. This configuration enables selective delivery of the fusing agent 36 across the whole width and length of the support member using multiple passes.

The fusing agent 36 may be a water-based dispersion including a radiation absorbing binding agent (i.e., the active material). In some instances, the fusing agent 36 consists of water and the active material. In other instances, the fusing agent 36 may further include dispersing agent(s), co-solvent(s), surfactant(s), antimicrobial agent(s), anti-kogation agent(s), chelating agent(s), and combinations thereof.

The fusing agent 36 is able to penetrate, at least partially, into the layer 24 of the polymeric build material 22. The polymeric build material 22 may be hydrophobic, and the presence of a co-solvent and/or a dispersant/surfactant in the fusing agent 36 may assist in obtaining a particular wetting behavior.

The active material in the fusing agent 36 may be any suitable material that absorbs electromagnetic radiation having a frequency ranging from about 3 THz to about 30 PHz. Examples of the active material include microwave radiation-absorbing susceptors, such as carbon black, graphite, various iron oxides (e.g., magnetite), conductive material, and/or semiconducting material.

The active material may also absorb radiation at other frequencies and wavelengths. As examples, the active material may be capable of absorbing IR radiation (i.e., a wavelength of about 700 nm to about 1 mm, which includes near-IR radiation (i.e., a wavelength of 700 nm to 1.4 μm)), ultraviolet radiation (i.e., a wavelength of about 10 nm to about 390 nm), visible radiation (i.e., a wavelength from about 390 nm to about 700 nm), or a combination thereof, in addition to microwave radiation (i.e., a wavelength of about 1 mm to 1 about m) and/or radio radiation (i.e., a wavelength from about 1 m to about 1000 m).

As one example, the fusing agent 36 may be an ink-type formulation including carbon black, such as, for example, the ink formulation commercially known as CM997A available from HP Inc. Within the fusing agent 36, the carbon black may be polymerically dispersed. The carbon black pigment may also be self-dispersed within the fusing agent 36 (e.g., by chemically modifying the surface of the carbon black). Examples of inks including visible light enhancers are dye based colored ink and pigment based colored ink, such as the commercially available inks CE039A and CE042A, available from Hewlett-Packard Company.

Examples of suitable carbon black pigments that may be included in the fusing agent 36 include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black 3160, Color Black S170, PRINTEX® 35, PRINTEX® U, PRINTEX® V, PRINTEX® 140U, Special Black 5, Special Black 4A, and Special Black 4).

As mentioned above, the carbon black pigment may be polymerically dispersed within the fusing agent 36 by a polymeric dispersant having a weight average molecular weight ranging from about 12,000 to about 20,000. In this example, the fusing agent 36 includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the fusing agent 36, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The amount of the active material that is present in the fusing agent 36 ranges from greater than 0 wt % to about 40 wt % based on the total wt % of the fusing agent 36. In other examples, the amount of the active material in the fusing agent 36 ranges from about 0.3 wt % to 30 wt %, or from about 1 wt % to about 20 wt %. It is believed that these active material loadings provide a balance between the fusing agent 36 having jetting reliability and heat and/or electromagnetic radiation absorbance efficiency.

As used herein, "liquid vehicle," and "vehicle" may refer to the liquid fluid in which the active material is placed to form the fusing agent 36. As mentioned above, in addition to water, the vehicle may include co-solvent(s), surfactant(s), antimicrobial agent(s), anti-kogation agent(s), chelating agent(s), and combinations thereof.

The water-based vehicle may include an organic co-solvent. The co-solvent(s) may be used to improve reliability, nozzle health, and decap performance (i.e., the ability of the fluid to readily eject from a printhead, upon prolonged exposure to air). The co-solvent(s) may be present, in total in the fusing agent 36, in an amount ranging from about 1 wt % to about 50 wt % (based on the total wt % of the fusing agent 36), depending, at least in part, on the jetting architecture. In an example, the co-solvent is present in the fusing agent 36 in an amount of about 10 wt % based on the total wt % of the fusing agent 36. It is to be understood that other amounts outside of this example and range may also be used. Examples of suitable co-solvents include high-boiling point solvents (some of them may also have a humectant functionality), which have a boiling point of at least 120° C. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the vehicle may include 1-(2-hydroxyethyl)-2-pyrrolidone.

The vehicle may also include surfactant(s). The surfactant(s) may be used to quickly wet the polymeric build material 22. As an example, the fusing agent 36 may include non-ionic, cationic, and/or anionic surfactants, which may be present in an amount ranging from about 0.01 wt % to about 5 wt % based on the total wt % of the fusing agent 36. In at least some examples, the vehicle may include a silicone-free alkoxylated alcohol surfactant such as, for example, TECO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the fusing agent 36 may include a total amount of antimicrobial agents that ranges from about 0.1 wt % to about 0.25 wt %.

When the fusing agent 36 is to be applied via thermal inkjet applications, an anti-kogation agent may also be included in the vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the fusing agent 36 in an amount ranging from about 0.1 wt % to about 1 wt % of the total wt % of the fusing agent 36.

The vehicle may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the fusing agent 36 may range from 0 wt % to about 1 wt % based on the total wt % of the fusing agent 36.

The balance of the vehicle is water. As such, the amount of water may vary depending upon the weight percent of the other fusing agent components. In an example, the water is deionized water.

It is to be understood that a single fusing agent 36 may be selectively applied to form the layer of the part precursor 12, or multiple fusing agents 36 may be selectively applied to form the layer of the part precursor 12.

After the fusing agent 36 is selectively applied in the desired portion(s) 40, the entire layer 24 of the polymeric build material 22 (including the fusing agent 36 applied to at least a portion thereof) is exposed to energy. This is shown at reference numeral 108 of FIG. 1.

The energy is emitted from an energy source 44. The energy source 44 may be any source that emits electromagnetic radiation having a frequency ranging from about 3 THz to about 30 PHz. Examples of suitable energy sources 44 include a UV, IR or near-IR curing lamp, or UV, IR or near-IR light emitting diodes (LED), lasers with specific UV, IR or near-IR wavelengths, visible light sources, microwave generators, radars, or the like, a microwave or RF furnace, a magnetron that emits microwaves, antenna structures that emit RF energy, etc.

The energy source 44 may be attached, for example, to a carriage that also holds the inkjet applicator(s) 38. The carriage may move the energy source 44 into a position that is adjacent to the support member (e.g., the fabrication bed 32). The energy source 44 may also be fixed above the support member. Other examples of the energy source 44 may require that the entire layer 24 of the polymeric build material 22 be removed from the support member and positioned within the source 44.

The energy source 44 may be programmed to receive commands from the central processing unit and to expose the layer 24, including the fusing agent 36 and polymeric build material 22, to the energy having the frequency ranging from about 3 THz to about 30 PHz.

The energy exposure time may be dependent on the characteristics of the energy source 44 chosen, the characteristics of the fusing agent 36 used and/or the characteristics of the polymeric build material 22.

The fusing agent 36 enhances the absorption of the energy, converts the absorbed energy to thermal energy, and promotes the transfer of the thermal heat to the polymeric build material 22 in contact therewith (i.e., in the portion(s) 40). In an example, the fusing agent 36 sufficiently elevates the temperature of the polymeric build material 22 above the melting point(s), allowing curing (e.g., sintering, binding, fusing, etc.) of the polymeric build material particles 22 in contact with the fusing agent 36 to take place. In an example, the temperature is elevated about 50° C. above the melting temperature of the polymeric build material 22. The fusing agent 36 may also cause, for example, heating of the polymeric build material 22, below its melting point but to a temperature suitable to cause softening and bonding. It is to be understood that portions 42 of the polymeric build material 22 that do not have the fusing agent 36 applied thereto do not absorb enough energy to fuse. Exposure to energy forms the 3D layer or part precursor 12 (formed of the cured/fused/melted/sintered polymeric build material 22'), as shown at reference numeral 108 in FIG. 1.

While the part precursor 12 is shown as a single layer, it is to be understood that the part precursor 12 may include several layers. Each additional layer of the part precursor 12 may be formed by repeating reference numerals 102-108. For example, to form an additional layer of the part precursor 12, an additional layer of the polymeric build material 22 may be applied to the part precursor 12 shown in reference numeral 108 and the additional layer may be preheated, may have the fusing agent 36 selectively applied thereto, and may be exposed to energy to form that additional layer. Any number of additional layers may be formed. When the part precursor 12 is complete, it may be removed from the fabrication bed 32, and any uncured polymeric build material 22 may be removed, and in some instances reused.

As described above, after the part precursor 12 is formed, the method 100 may include blasting the part precursor 12 with the blast media 14 in order to form the final part 20 with the coating 18' thereon.

To further illustrate the present disclosure, examples are given herein. It is to be understood that these examples are provided for illustrative purposes and are not to be construed as limiting the scope of the present disclosure.

EXAMPLES

Example 1

Several examples of the part, including the coating, and a comparative part were prepared. The example parts and the comparative part were formed in a MJF process from Nylon (PA) 12.

The example parts were blasted with coarse glass and alumina blasting beads or fine glass and alumina blasting beads and varying amounts of graphite. Example parts 1-4 were formed with coarse glass and alumina blasting beads and the following graphite amounts: (1) 0.05 wt %, (2) 0.1 wt %, (3) 0.5 wt %, and (4) 1 wt %. Example parts 5-8 were formed with fine glass and alumina blasting beads and the following graphite amounts: (5) 0.075 wt %, (6) 0.1 wt %, (7) 0.25 wt %, and (8) 0.5 wt %. The comparative parts 9 and 10 were respectively formed with coarse glass and alumina blasting beads and fine glass and alumina blasting beads without any graphite (0 wt %). The example and comparative parts were blasted in a compressed air blasting cabinet at a rate of about 0.5 s/cm$^2$ using a ⅜" nozzle and air at 80 PSI.

Figure 2:
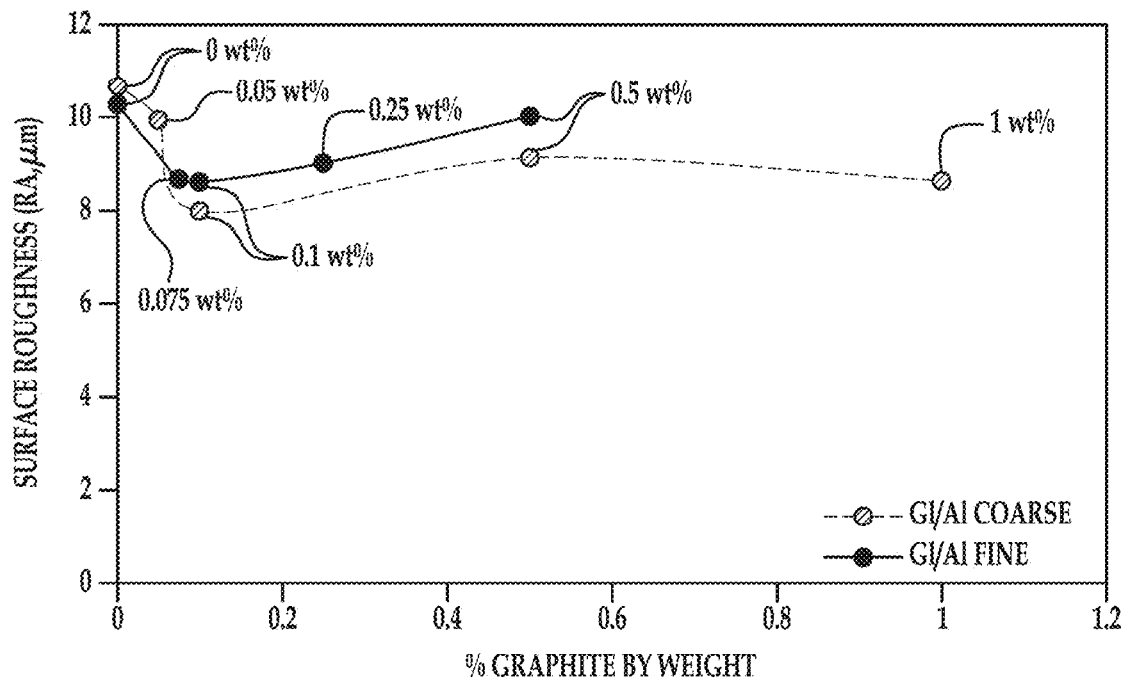
FIG. 2 is a graph depicting surface roughness versus the percent of graphite by weight of example parts formed according to the coating method disclosed herein and comparative example parts formed without graphite.

The surface roughness (RA) of each example part and comparative example part was measured using a handheld profilometer. The results of the surface roughness measurements are shown in FIG. 2. The surface roughness values in μm are along the Y axis and the percentage of graphite by weight used in the blast medium is shown along the X axis. As shown in FIG. 2, example part 2, the example part that was blasted with blast medium containing the coarse glass and alumina blasting beads and 0.1 wt % blended graphite, had the lowest surface roughness.

Figure 3:
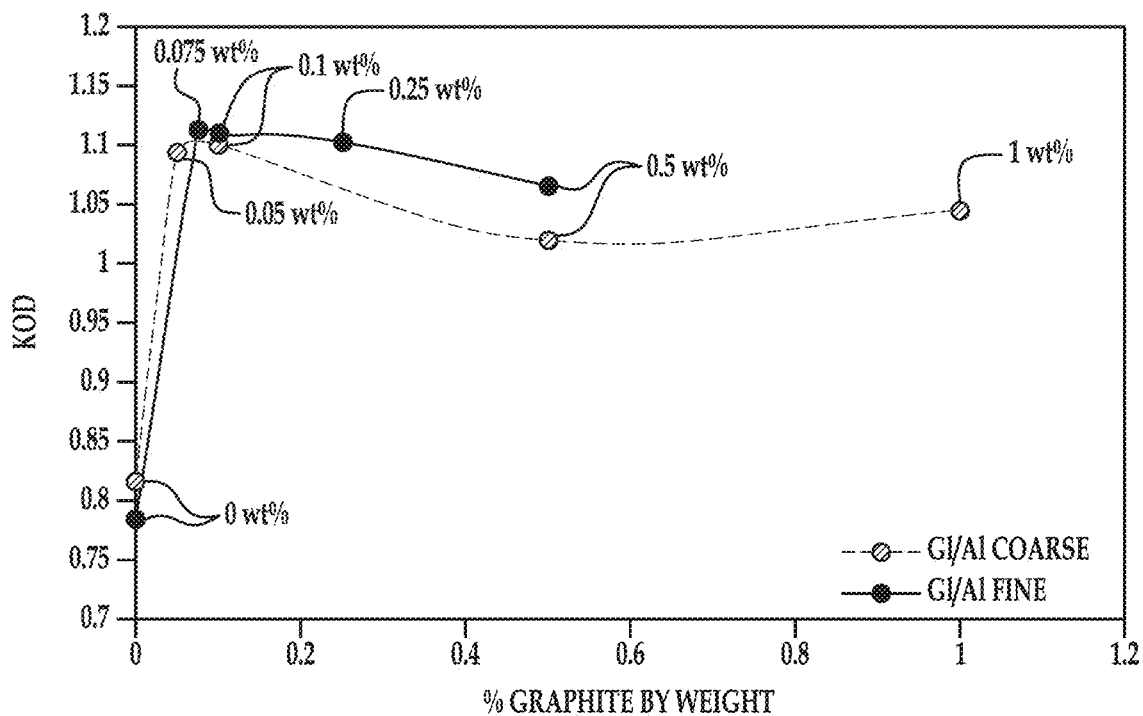
FIG. 3 is a graph depicting optical density versus the percent of graphite by weight of example parts formed according to the coating method disclosed herein and comparative example parts formed without graphite.

The optical density (KOD) of each example part and comparative example part was measured using a spectrodensitometer. The results of the optical density measurements are shown in FIG. 3. The optical density values are along the Y axis and the percentage of graphite by weight used in the blast medium is shown along the X axis. As shown in FIG. 3, the example part 2 had one of the highest optical density values, along with examples parts 1, 5, 6, and 7.

Figure 4A:
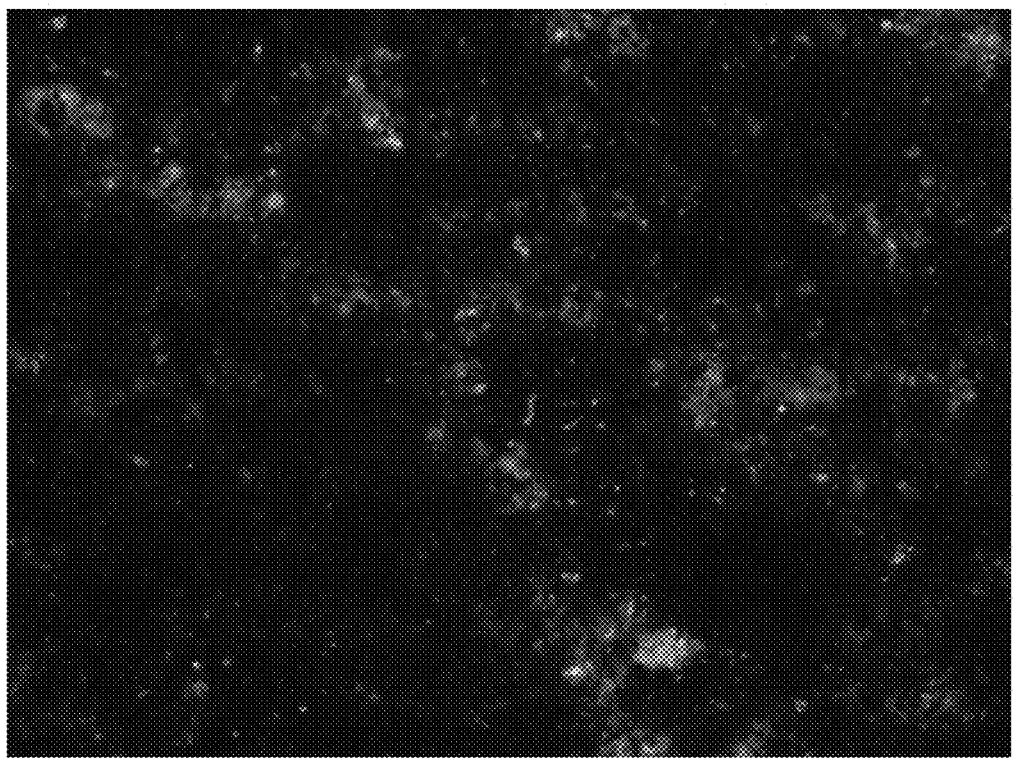
FIG. 4A is a microscopic image of a portion of an example part formed according to the coating method disclosed herein.
Figure 5A:
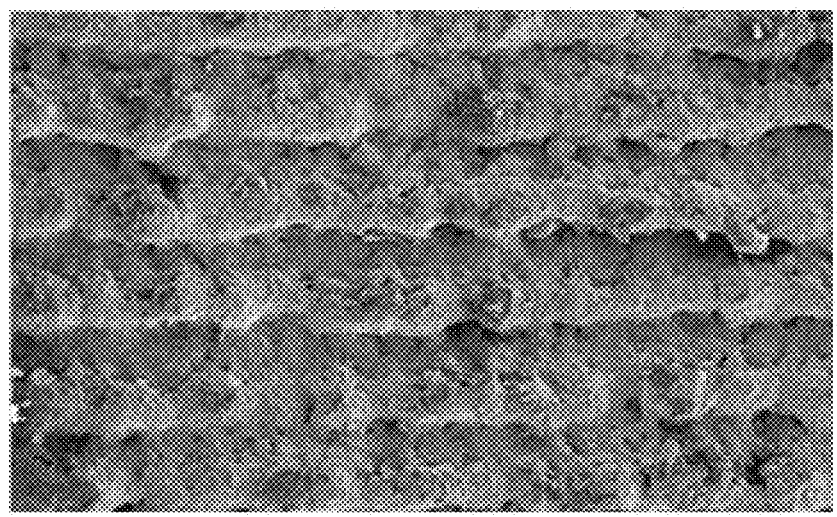
FIG. 5A is a magnified (50×) scanning electron microscope (SEM) image, using a scalar bar of 1.00 mm, of a portion of the example part shown in FIG. 4A.

FIG. 4A shows an image of a portion of example part 2. FIG. 5A shows a magnified image, using a scalar bar of 1.00 mm, of a portion of example part 2.

Figure 4B:
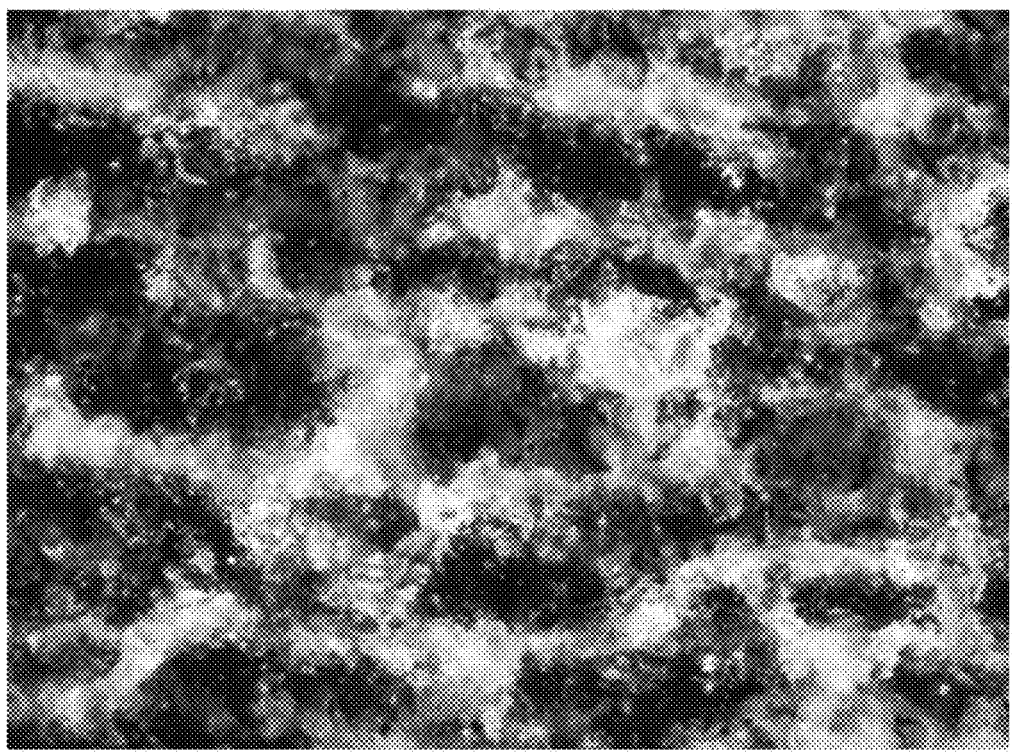
FIG. 4B is a microscopic image of a portion of a comparative part.
Figure 5B:
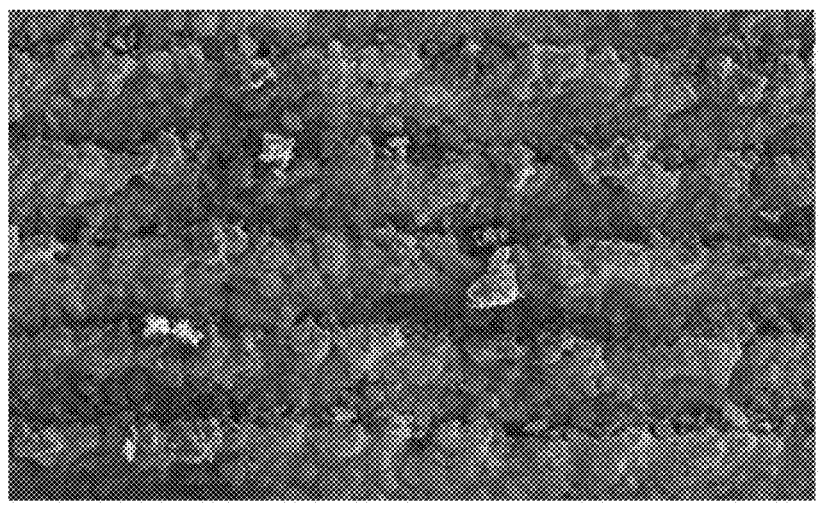
FIG. 5B is a magnified (50×) scanning electron microscope (SEM) image, using a scalar bar of 1.00 mm, of a portion of the comparative part shown in FIG. 4B.

As mentioned above, comparative part 9 was blasted with coarse glass and alumina blasting beads and no graphite in a compressed air blasting cabinet at a rate of about 0.5 s/cm$^2$ using a ⅜" nozzle and air at 80 PSI. FIG. 4B shows an image of a portion of comparative part 9, and FIG. 5B shows a magnified image, using a scalar bar of 1.00 mm, of a portion of comparative part 1. As shown in FIGS. 4A, 4B, 5A, and 5B, example part 2 is darker, more uniform in color, and smoother than comparative part 9.

Example 2

Several examples of the part, including the coating, and a comparative part were prepared. The example parts and the comparative part were formed from injection molded Nylon (PA) 12.

Example part 11 was blasted with coarse glass and alumina blasting beads and 0.1 wt % blended graphite. Example part 11 was blasted in a compressed air blasting cabinet at a rate of about 0.5 s/cm$^2$ using a ⅜" nozzle and air at 80 PSI. Example part 11 is the middle part shown in FIG. 6.

Example part 12 was blasted with garnet blasting beads and 0.1 wt % blended graphite. Example part 12 was blasted in a compressed air blasting cabinet at a rate of about 0.5 s/cm² using a ⅜" nozzle and air at 80 PSI. Example part 12 is the bottom part shown in FIG. 6.

Figure 6:
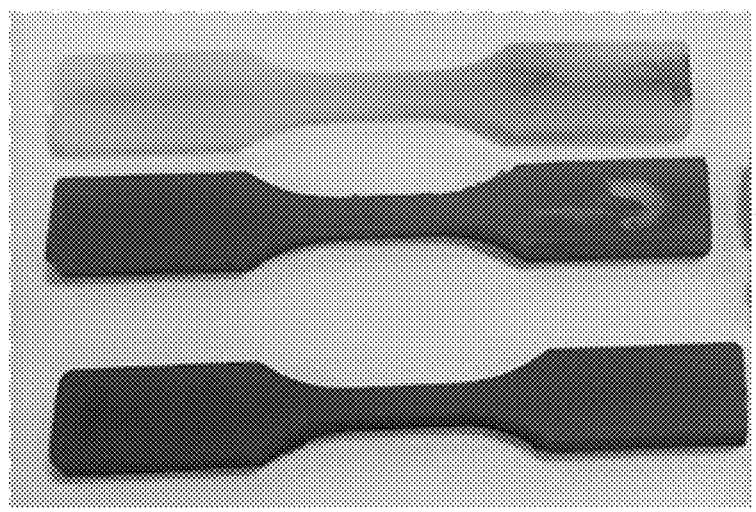
FIG. 6 is a black and white image of another comparative part (top), another example part (middle), and another example part (bottom).

Comparative part 13 was not blasted with a blast medium. Comparative part 13 is the top part shown in FIG. 6. As shown in FIG. 6, example parts 11 and 12 are darker and uniform in color, and comparative part 13 is the color of the Nylon (PA) 12 from which it was formed.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 1 μm and up to about 500 μm should be interpreted to include the explicitly recited limits of greater than 1 μm to about 500 μm, as well as individual values, such as 50 μm, 125 μm, 300.5 μm, 495 μm, etc., and sub-ranges, such as from about 35 μm to about 375 μm, from about 60 μm to about 225 μm, from about 115 μm to about 455 μm, from about 200 μm to about 475 μm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A coating method, comprising:
   forming a coating on a part precursor by blasting the part precursor with a blast medium, the blast medium including:
   blasting beads; and
   a coating agent present in an amount ranging from greater than 0 wt % to about 0.4 wt % based on a total weight of the blast medium;
   wherein the part precursor is formed from a polymeric build material, and a hardness of the blasting beads is greater than a hardness of the polymeric build material;
   wherein:
   the coating agent is graphite;
   the coating agent is present in the blast medium in amount of about 0.1 wt % based on a total wt % of the blast medium; and
   the blasting beads are garnet.

2. The method as defined in claim 1 wherein the hardness of the blasting beads is from about 2 units to about 5 units greater than the hardness of the polymeric build material on a Mohs scale of hardness.

3. The method as defined in claim 1 wherein a particle size of the blasting beads ranges from about 0.1 mm to about 1 mm.

4. The method as defined in claim 1 wherein a size distribution of the coating agent is 20 μm≤D90≤70 μm, and D90 is an average particle size that about 90% of particles of the coating agent are smaller than.

5. The method as defined in claim 1 wherein the coating agent has a springback value that is less than about 20%.

6. The method as defined in claim 1 wherein the blasting of the part precursor with the blast medium embeds the coating agent into the part precursor.

7. The method as defined in claim 1 wherein the coating formed on the part precursor has a thickness ranging from about 10 nm to about 20 μm.

8. The method as defined in claim 1, further comprising forming the part precursor by:
   selectively applying a fusing agent on at least a portion of the polymeric build material; and
   exposing the polymeric build material to radiation, thereby fusing the at least the portion of the polymeric build material in contact with the fusing agent.

9. The method as defined in claim 1 wherein the part precursor is formed of a polyamide build material.

\* \* \* \* \*